United States Patent
Sundqvist et al.

(10) Patent No.: US 6,873,954 B1
(45) Date of Patent: Mar. 29, 2005

(54) METHOD AND APPARATUS IN A TELECOMMUNICATIONS SYSTEM

(75) Inventors: Jim Sundqvist, Regnvägen (SE); Tomas Frankkila, Kabelgatan (SE); Anders Nohlgren, Rektorsgatan (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 498 days.

(21) Appl. No.: 09/655,326

(22) Filed: Sep. 5, 2000

(30) Foreign Application Priority Data

Sep. 9, 1999 (SE) .............................................. 9903223

(51) Int. Cl.⁷ .............................................. G10L 13/02
(52) U.S. Cl. ...................... 704/262; 704/220; 704/219; 704/264; 704/268
(58) Field of Search ................................ 704/258, 262, 704/264, 268, 219, 205, 207, 220

(56) References Cited

U.S. PATENT DOCUMENTS

| | | | | | |
|---|---|---|---|---|---|
| 4,435,832 A | * | 3/1984 | Asada | ......................... | 704/262 |
| 4,864,620 A | * | 9/1989 | Bialick | ...................... | 704/207 |
| 5,067,158 A | * | 11/1991 | Arjmand | ..................... | 704/219 |
| 5,073,938 A | * | 12/1991 | Galand | ........................ | 704/207 |
| 5,426,718 A | * | 6/1995 | Funaki | ......................... | 704/216 |
| 5,517,521 A | * | 5/1996 | Strawn | ........................ | 375/219 |
| 5,598,466 A | * | 1/1997 | Graumann | ............. | 379/388.04 |
| 5,617,507 A | * | 4/1997 | Lee | ............................. | 704/200 |
| 5,694,521 A | * | 12/1997 | Shlomot | ..................... | 704/262 |
| 5,717,823 A | * | 2/1998 | Kleijn | ......................... | 704/220 |
| 5,825,771 A | | 10/1998 | Cohen et al. | ............... | 370/394 |
| 6,029,134 A | * | 2/2000 | Nishiguchi | .................. | 704/268 |
| 6,073,092 A | * | 6/2000 | Kwon | ........................ | 704/219 |
| 6,311,154 B1 | * | 10/2001 | Gersho | ........................ | 704/219 |

FOREIGN PATENT DOCUMENTS

| | | | | |
|---|---|---|---|---|
| EP | 0680033 A2 | * | 4/1995 | ............. G10L/3/00 |
| EP | 0 680 033 A2 | | 11/1995 | |
| EP | 0743773 A2 | * | 11/1996 | ............. H04L/7/00 |

OTHER PUBLICATIONS

Krembel, L., European Patent Office Standard Search Report, File No. RS 103654 SE, Oct., 22, 1999, pp. 1–4.

* cited by examiner

*Primary Examiner*—Vijay B. Chawan

(57) ABSTRACT

Audio artifacts due to overrun or underrun in a playout buffer caused by the sampling rates at a sending and receiving side not being at the same rate are reduced. An LPC-residual is modified on a sample-by-sample basis. The LPC-residual block, which includes N samples, is converted to a block comprising N+1 or N−1 samples. A sample rate controller decides whether samples should be added to or removed from the LPC-residual. The exact position at which to add respective remove samples is either chosen arbitrarily or found by searching for low energy segments in the LPC-residual. A speech synthesiser module then reproduces the speech. By using the proposed sample rate conversion method the playout buffer can be continuously controlled. Furthermore, since the method works on a sample-by-sample basis the buffer can be kept to a minimum and hence no extra delay is introduced.

43 Claims, 6 Drawing Sheets

METHOD AND APPARATUS IN A TELECOMMUNICATIONS SYSTEM

TECHNICAL FIELD OF THE INVENTION

The present invention relates generally to apparatuses and methods for improving speech quality in e.g. IP-telephony systems. More particularly, the present invention relates to a method and apparatus for reducing audio artifacts due to overrun or underrun in a playout buffer.

The invention also relates to an arrangement for carrying out the method.

DESCRIPTION OF RELATED ART

When sampling frequencies, in e.g. a speech coding system, are not controlled, underrun or overrun might occur in the playout buffer, which is a buffer storing speech samples for later playout. Underrun means that the playout buffer will run into starvation, i.e. it will no longer have any samples to play on the output. Overrun means that the playout buffer will be filled with samples and that following samples cannot be buffered and consequently will be lost. Underrun is probably more common than overrun since the size of the playout buffer can increase until there is no memory left, while it only can decrease until there are no samples left.

Currently, most systems do not deal with the problem that the sampling frequency might differ considerably between the sending and the receiving side. One possible solution proposed in, EP-0680033 A2, works on pitch periods. Adding or removing pitch periods in the speech signal achieves a different duration of a speech segment without affecting other speech characteristics other than speed. This proposed solution might be used as an indirect sample rate conversion method.

Another solution uses the beginning of talkspurts as an indication to reset the playout buffer to a specified level. The distance, in number of samples, between two consecutive talkspurts is increased if the receiving side is playing faster than the sending side and decreased if the receiving side is playing slower than the sending side. In IP-telephony solutions using the IP/UDP/RTP-protocols (Internet Protocol/User Datagram Protocol/Real Time Protocol), a marker flag in the RTP header is used to identify the beginning of a talkspurt. At the beginning of a talkspurt, the playout buffer is set to a suitable size.

The solution according to EP-0680033 A2, where pitch periods are removed or inserted, assumes a fixed conversion factor between the receiving and transmitting side. Therefore, it cannot be used in dynamic systems, i.e. where the sampling frequencies varies. Further, it does not solve the problem with underrun or overrun situations, but is instead focused on changing the playback rate of a speech signal stored in compressed form for playback later and at a different speed to that at which it was stored.

Using the method of resetting the playout buffer to a certain size causes problems if there are very long talkspurts, e.g. broadcast from one speaker to several listeners. Since the length of a talkspurt is not defined in the beginning of the talkspurt, the size to reset to might be either too small or too large. If it is too small, underrun will occur and if it is too large, unnecessary delay is introduced. Thus, the problem persists.

The general problem with the currently known approaches is that they are static and inflexible. Therefore, dynamic solutions are required.

SUMMARY OF THE INVENTION

The present invention deals with the problem of improving speech quality in systems where the sampling rate at a transmitting terminal differs from the playout rate of a receiving buffer at a receiving terminal. This is often the case in e.g. IP-telephony.

When sampling frequencies are not controlled, underrun or overrun might occur in the playout buffer at the receiving side, which causes audible artifacts in the speech signal. To avoid said overrun or underrun there is an need for dynamically keeping the playout buffer to an average size, i.e. controlling the fullness of the playout buffer.

One object of the present invention is thus to provide a method for reducing audio artifacts in a speech signal due to overrun or underrun in the playout buffer.

Another object of the invention is to dynamically control the fullness of the playout buffer so as not to introduce extra delay.

The above mentioned and other objects are achieved by means of dynamic sample rate and conversion of speech frames, i.e. converting speech frames comprising N samples to instead comprise either N+1 or N−1 samples. More specifically, the invention works on an LPC-residual of the speech frame. By adding or removing a sample in the LPC-residual, a sample rate conversion will be achieved. The LPC-residual is the output from an LPC-filter, which removes the short-term correlation from the speech signal. The LPC-filter is a linear predictive coding filter where each sample is predicted as a linear combination of previous samples.

By using the proposed sample rate conversion method, the playout buffer, of e.g. an IP-telephony terminal, can be continuously controlled with only small audio artifacts. Since the method works on a sample-by-sample basis, the playout buffer can be kept to a minimum and hence no extra delay is introduced. The solution also has very low complexity, especially when the LPC-residual already is available, as in the case in e.g. a speech decoder.

The term "comprises/comprising" when used in this specification is taken to specify the presence of stated features, integers, steps or components but does not preclude the presence or addition of one or more other features, integers, steps, components or groups thereof.

Although aspects of the invention have been summarised above, the method and apparatus according to the appended claims define the scope of the invention.

DETAILED DESCRIPTION

Figure 1:
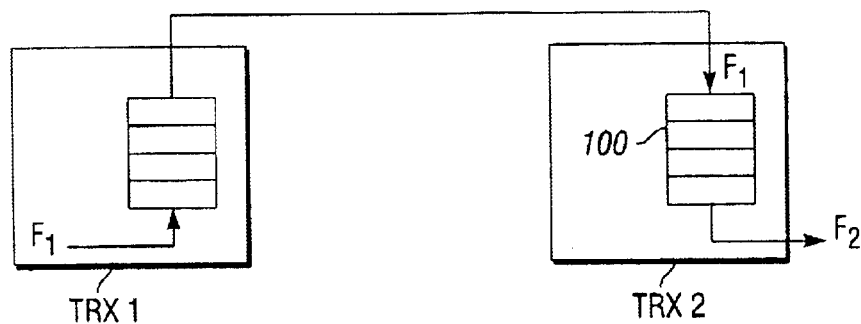
FIG. 1 shows a transmitter and a receiver to which the method of the invention can be applied.

Referring to FIG. 1, a method for improving speech quality in a communication system includes a first terminal unit TRX1 transmitting speech signals having a first sample frequency $F_1$ and a second terminal unit TRX2 receiving said speech signals, buffering them in a playout buffer 100 with said first frequency $F_1$ and playing out from said playout buffer with a second frequency $F_2$. When the buffering frequency $F_1$ is larger than the playout frequency $F_2$, the playout buffer 100 will eventually be filled with samples and subsequent samples will have to be discarded. When the buffering frequency $F_1$ is lower than the playout frequency $F_2$ the playout buffer will run into starvation, i.e. it will no longer have any samples to play on the output. These two problems are called overrun and underrun, respectively, and cause audible artifacts like popping and clicking sounds in the speech signal.

The above and other problems with underrun and overrun are solved by using dynamic sample rate conversion based on modifying the LPC-residual of the speech signal and will be further described with reference to FIGS. 2–8.

Figure 2:
FIG. 2 shows a speech signal in the time domain.

FIG. 2 shows a typical segment of a speech signal in the time domain. This speech signal shows a short-term correlation, which corresponds to the vocal tract and a long-term correlation, which corresponds to the vocal cords. The short-term correlation can be predicted by using the LPC-filter and the long-term correlation can be predicted by using an LTP-filter. LPC means linear predictive coding and LTP means long term prediction. Linear in this case implies that the prediction is a linear combination of previous samples of the speech signal.

The LPC-filter is usually denoted:

$$H(z) = \frac{1}{A(z)} = \frac{1}{1 - \sum_{i=1}^{n} a_i z^{-i}}$$

By feeding a speech frame through the LPC-filter, H(z), the LPC-residual is found. The LPC-residual, shown in FIG. 3, contains pitch pulses P generated by the vocal cords. The distance L between two pitch pulses P is called lag. The pitch pulses P are also predictable, and since they represent the long-term correlation of the speech signal they are predicted through an LTP-filter given by the distance L between the pitch pulses P and the gain b of a pitch pulse P. The LTP-filter is usually detected.

$$F(z) = b \cdot z^{-L}$$

When the LPC-residual is fed through the inverse of the LTP-filter F(z), and LTP-residual is created. In the LTP-residual, the long-term correlation in the LPC-residual is removed, giving the LTP-residual a noise-like appearance.

Figure 3:
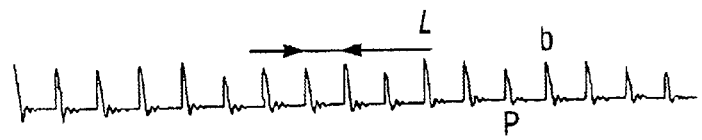
FIG. 3 shows an LPC-residual of a speech signal in the time domain.

The solution according to the invention modifies the LPC-residual, shown in FIG. 3, on a sample-by-sample basis. That is, an LPC-residual block comprising N samples is converted to an LPC-residual block comprising either N+1 or N−1 samples. The LPC-residual contains less information and less energy compared to the speech signal, but the pitch pulses P are still easy to locate. When modifying the LPC-residual, samples that are close to a pitch pulse P should be avoided, because these samples contain more information and thus have a large influence on the speech synthesis. The LTP-residual is not as suitable as the LPC-residual to use for modification since the pitch pulse positions P are no longer available. Thus, the LPC-residual is better suited for modifications both compared to the speech signal and to the LTP-residual, since the pitch pulses P are easily located in the LPC-residual.

Figure 4:
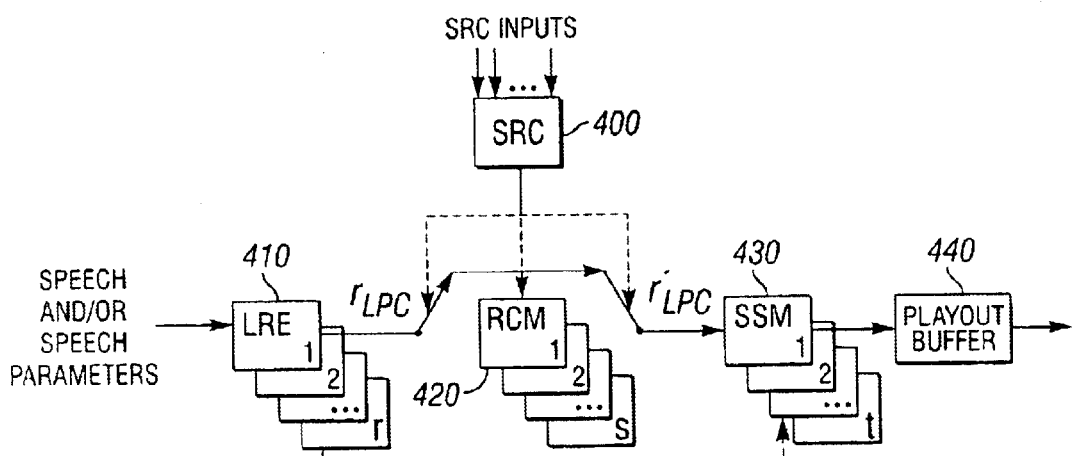
FIG. 4 illustrates four modules of the sample rate conversion method according to the invention.

A sample rate conversion consists of four modules, shown in FIG. 4.

1) A Sample Rate Controller (SRC) module 400 that calculates whether a sample should be added or removed;

2) LPC-Residual Extraction (LRE) modules 410 that are used to obtain the LPC-residual $r_{LPC}$;

3) Sample Rate Conversion Methods (RCM) modules 420 that find the position at which to add or remove samples and determine how to perform the insertion and deletion, i.e. converting the LPC residual block $r_{LPC}$ comprising N samples to a modified LPC-residual block $r_{LPC}$ comprising N+1 or N−1 samples; and 4) A Speech Synthesiser Module (SSM) 430 to reproduce the speech.

An idea behind embodiments of the invention is that it is possible to change the playout rate of the playout buffer 440 by removing or adding samples in the LPC-residual $r_{LPC}$.

The SRC module 400 decides whether samples should be added or removed in the LPC residual $r_{LPC}$. This is done on the basis of at least one of the four following parameters: the sampling frequencies of the sending TRX1 and receiving terminal units TRX2, information about the speech signal e.g. a voice activity detector signal, status of the playout buffer, an indicator of the beginning of a talkspurt. The four parameters are designated SRC Inputs in FIG. 4. On the basis of a function of one or several of these parameters the SRC 400 decides when to insert or remove a sample in the LPC residual $r_{LPC}$ and optionally which RCM 420 to use. Since digital processing of speech signals usually is made on a frame-by-frame basis, the decision of when to remove or add samples basically is to decide within which LPC-residual $r_{LPC}$ frame the ROM 420 is to insert or remove a sample.

There are basically three methods of obtaining the LPC-residual $r_{LPC}$ that is needed as input to the RCM's 420. The methods depend on the implementation of the speech encoder and will be described with reference to FIGS. 5A–5F. The LRE solution also directly influences the SSM solution, which will become apparent below.

Figure 5A:
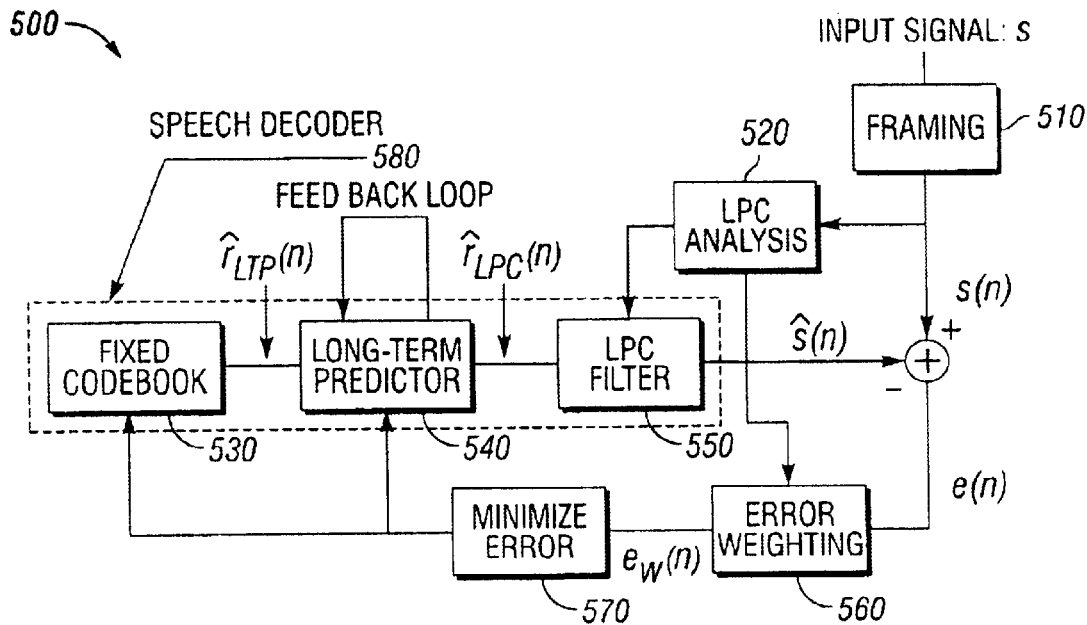
FIG. 5A shows an analysis-by-synthesis speech encoder with LTP-filter.

In FIG. 5A an analysis-by-synthesis speech encoder 500 with LTP-filter 540 is shown. This is a hybrid encoder where the vocal tract is described with an LPC-filter 550 and the vocal cords is described with a LTP-filter 540, while the LTP-residual $\hat{r}_{LPC}^{(n)}$ is waveform-compared with a set of more or less stochastic codebook vectors from a fixed codebook 530. The input signal S is divided into frames 510 with a typical length of 10–30 ms. For each frame the LPC-filter 550 is calculated through an LPC-analysis 520 and the LPC-filter 550 is included in a closed loop to find the parameters of the LTP-filter 540. The speech decoder 580 is included in the encoder and consists of the fixed codebook 530, whose output $\hat{r}_{LPC}^{(n)}$ is connected to the LTP-filter 540, whose output $\hat{r}_{LPC}^{(n)}$ is connected to the LPC-filter 550, which generates an estimate $\hat{s}(n)$ of the original speech signal s(n). Each estimate signal $\hat{s}(n)$ is compared with the original speech signal s(n) and a difference signal e(n) is calculated. The difference signal e(n) is then weighted by an error-weighting block 560 to calculate a perceptual weighted error measure $e_w(n)$. The set of parameters that gives the least perceptual weighted error measure $e_w(n)$ is transmitted to a receiving side 570.

Figure 5B:
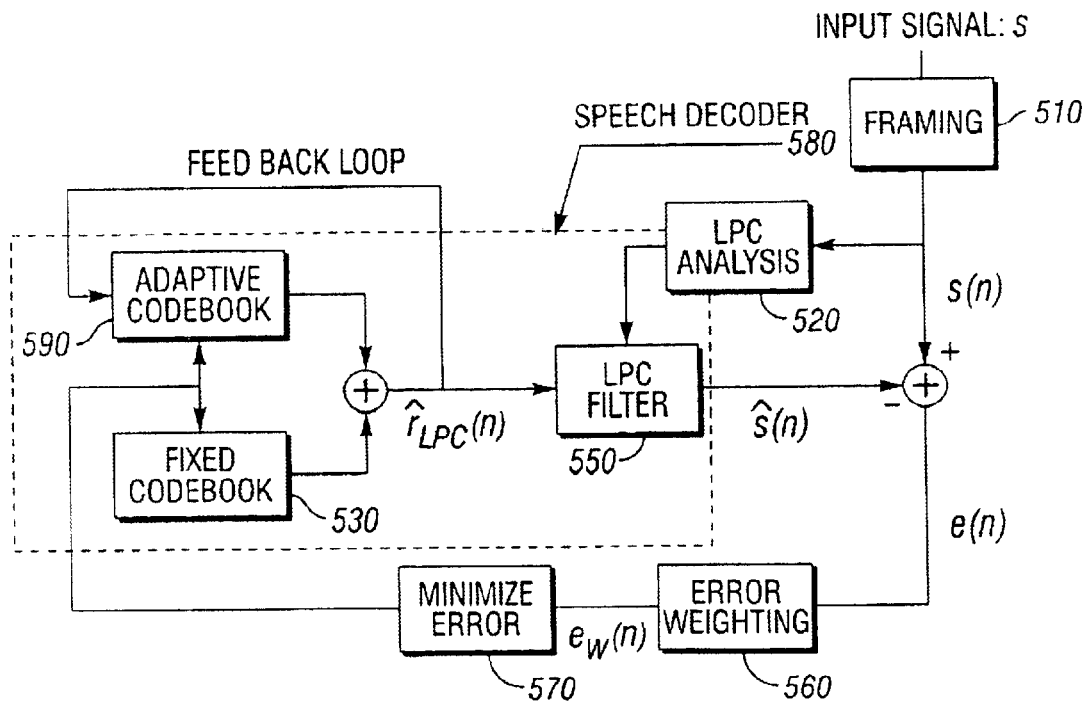
FIG. 5B shows an analysis-by-synthesis speech encoder with adaptive codebook.
Figure 5C:
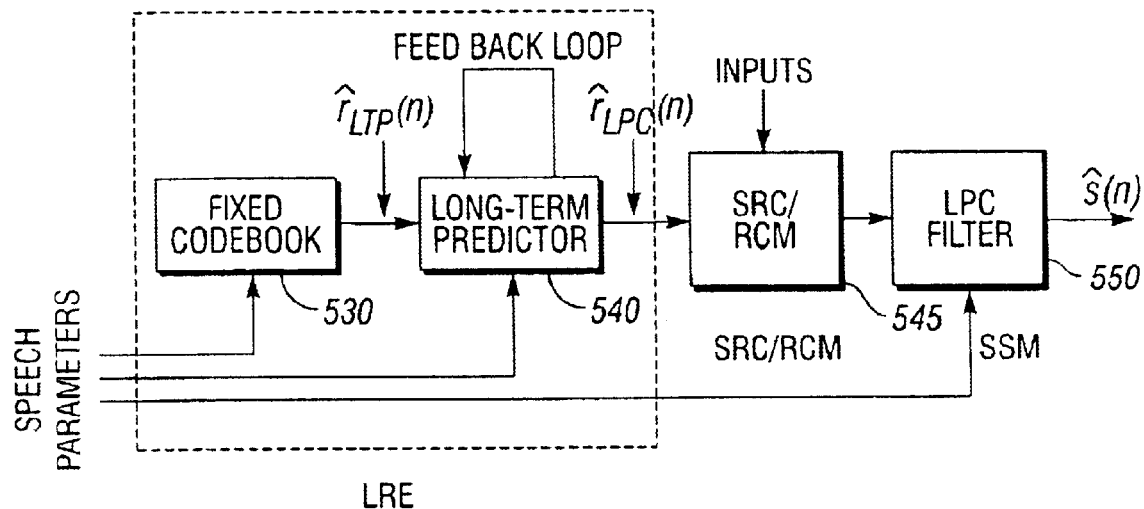
FIGS. 5C–5F show different implementations of the LPC-residual extraction depending on the realisation of the speech encoder.

As can be seen in FIG. 5C, the LPC-residual $\hat{r}_{LPC}^{(n)}$ is the output from the LTP-filter 540. SRC/RCM modules 545 can be connected directly to the output of the LTP-filter 540 and integrated into the speech encoder. An LRE consists of the fixed codebook 530 and the long-term predictor 540 and the SSM consists of an LPC-filter 550, thus the LRE-module and the SSM-module are natural parts of the speech decoder.

Figure 5D:
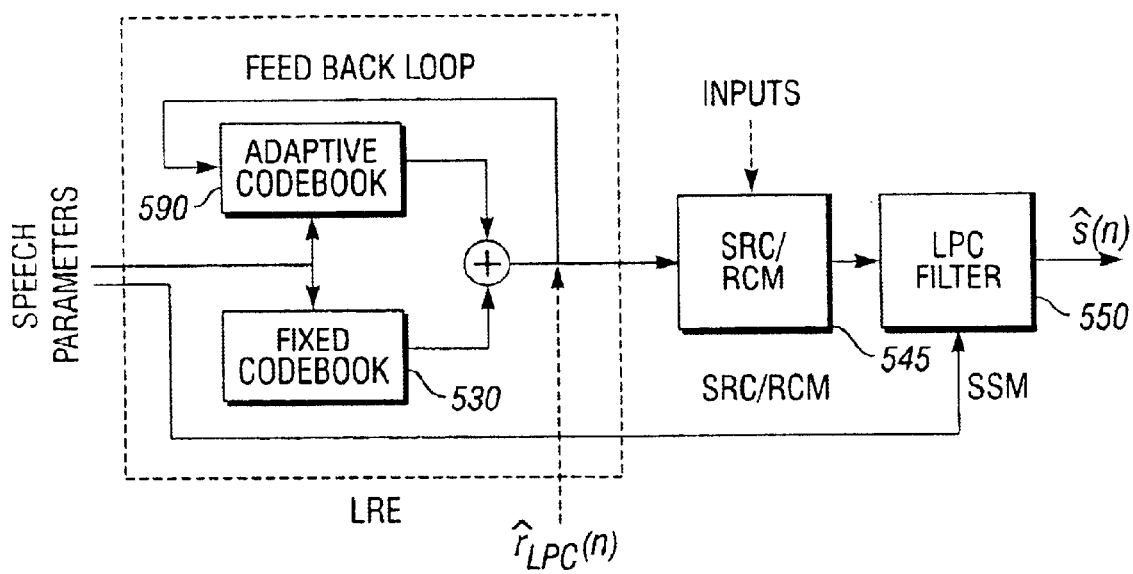

If the speech encoder, on the other hand, is an analysis-by-synthesis speech encoder where the LTP-filter 540 is exchanged to an adaptive codebook 590 as shown in FIG. 5B, the LPCresidual LPC(n) is the output from the sum of the adaptive and the fixed codebooks 590 and 530. All other elements have the same function as in FIG. 5A which shows an analysis-by-synthesis speech encoder with LTP-filter 500. As can be seen in FIG. 5D the LPC residual $\hat{r}_{LPC}^{(n)}$ is the sum of the output from the adaptive and fixed codebook 590 and 530. The SRC/RCM modules 545 can thus again be connected to the output and integrated into the speech encoder as shown in FIG. 5D. The LRE consists of the adaptive and the fixed codebook 590 and 530 and the SSM consists of an LPC-filter 550, thus the LRE module and the SSM module are again natural parts of the speech decoder.

Figure 5E:
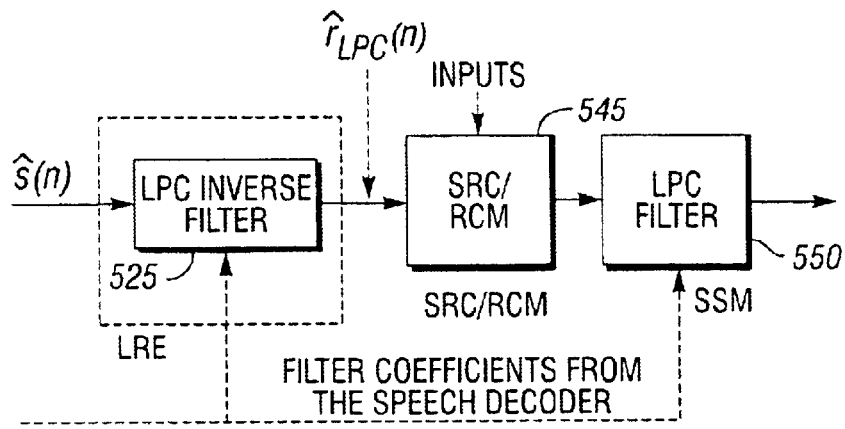

When the speech encoder has some sort of backward adaptation, it is not feasible to make alterations in the LPC-residual since this would affect the adaptation process in a detrimental way. In FIG. 5E is shown how in these cases the parameters $\hat{s}(n)$ from the LPC-filter 550 can be fed to an inverse LPC-filter 525 placed after the speech decoder. After the sample rate conversion has been made in the SRC/RCM modules 545 an LPC-filtering 550 is performed to reproduce the speech signal. The LRE module consists of the inverse LPC-filter 525 and the SSM module consists of the LPC-filter 550.

Figure 5F:
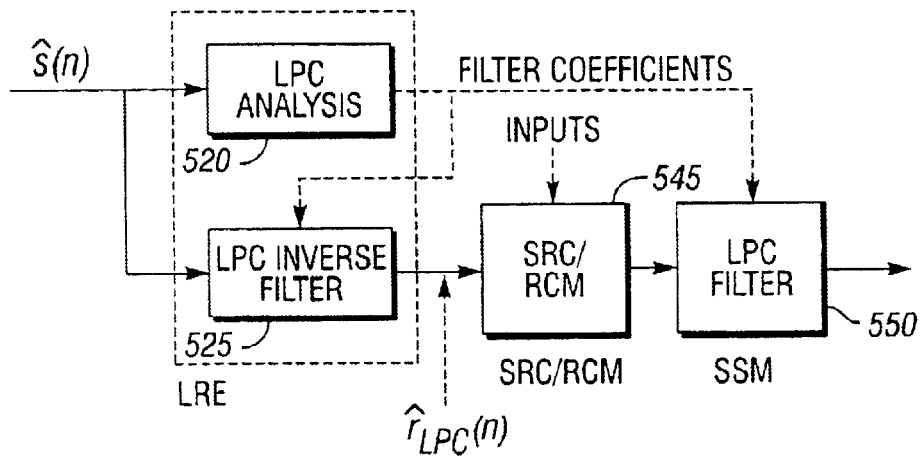

In FIG. 5F it is shown how it is possible to produce an LPC residual $\hat{r}_{LPC}^{(n)}$ through a full LPC analysis. The output $\hat{s}(n)$ from the speech decoder is fed to both an LPC analysis block 520 and an LPC-inverse filter 525. After the sample rate conversion has been made in the SRC/RCM modules 545, and LPC filtering 550 is performed to reproduce the speech signal. The LRE consists in this case of the LPC analysis 520 respective the LPC inverse filter 525 and the SSM module consists of the LPC filter 550. Performing an LPC analysis is considered to be well known to a person skilled in the art and is therefore not discussed any further.

Referring again to FIG. 4, assume that the SRC-module 400 has decided that a sample should be added or removed in the LPC residual $r_{LPC}$ and that the LRE module 410 has produced an LPC residual $r_{LPC}$. The RCM-module 420 then has to find the exact position in the LPC-residual $r_{LPC}$ where to add or remove a sample and performing the adding respective removing. There are four different methods for the RCM-module 420 to find the insertion or deletion point.

The first and most primitive method arbitrarily removes or adds a sample whenever this becomes necessary. If the sample rate difference between the terminals is small this will only lead to mirror artifacts since the adding or removing is performed very seldom.

By inserting or removing samples at positions where the energy in the LPC-residual is low the synthesis will be less affected. This is due to the fact that segments close to pitch pulses will then be avoided. To find these segments of low energy either a sliding window method or a simpler block energy analysis can be used.

The second method, called the sliding window energy method, calculates a weighted energy value for each sample in the LPC-residual. This is done by multiplying k samples surrounding a sample with a window function of size k (k<<N), where N equals the number of samples in the LPC-residual. Each sample is then squared and the sum of the resulting k values is calculated. The window is shifted one position and the procedure is repeated. The position where to insert or remove samples is given by the sample with the lowest weighted energy value.

The third method, block energy analysis, is a simpler solution for finding the insertion or deletion point. The LPC-residual is simply divided into blocks of equal length and an arbitrary sample is removed or added in the block with the lowest energy.

Figure 6:
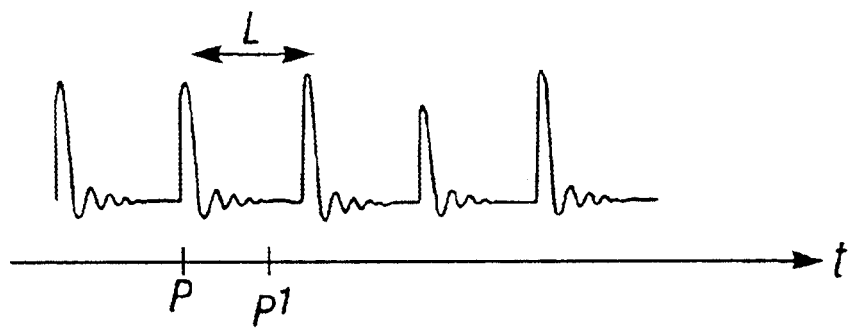
FIG. 6 illustrates how to use information about pitch pulses to find samples with low energy.

The fourth method, illustrated in FIG. 6, uses knowledge about the position P of a pitch pulse, and the lag L between two pitch pulses. With this knowledge, it is possible to calculate a position P' having low energy at which it is therefore appropriate to add or remove a sample. The new position P' can be expressed as P'=P+k·L, wherein the constant k is selected so that P' is selected to be somewhere in the middle between two pitch pulses, thus avoiding positions with high energy. A typical value of k is in the range of 0.5 to 0.8.

When the RCM-module 420 has calculated the position at which to add or remove a sample it must be determined how to perform the insertion or deletion. There are three methods of performing such insertions or deletion depending on the type of LRE-module used.

In the first method, either zeros are added or samples with small amplitudes are removed. This method can be used for all LRE solutions described above. (See FIGS. 5C–5F.) Notice that in FIGS. 5C and 5D the SRC/RCM-modules are placed before the synthesis filter SSM, but after the feed back of the LPC residual to the LTP-filter 540 respective the adaptive codebook 590.

In the second method, insertion is carried out by adding zeros and interpolating surrounding samples. Deletion is performed by removing samples and preferably smoothing surrounding samples. This method can also be used for all of the LRE solutions described above. (See FIGS. 5C–5F). Notice that in FIGS. 5C and 5D the SRC/RCM-modules are placed before the synthesis filter SSM, but after the feed back of the LPC residual to the LTP-filter 540 respective the adaptive codebook 590.

In the third method, the SCR/RCM-modules 545 are placed within the feedback loop of the speech decoder instead of after the feedback loop as in the previous methods. (See FIGS. 5G–5J.) Placing the SRC/RCM-modules within the feedback loop uses real LPC residual samples for the sample rate conversion, by changing the number of components in the LPC-residual. The implementation differs depending on whether it is an analysis-by-synthesis speech encoder with LTP filter shown in FIG. 5A or an analysis-by-synthesis speech encoder with adaptive codebook shown in FIG. 5B that is used.

Figure 5G:
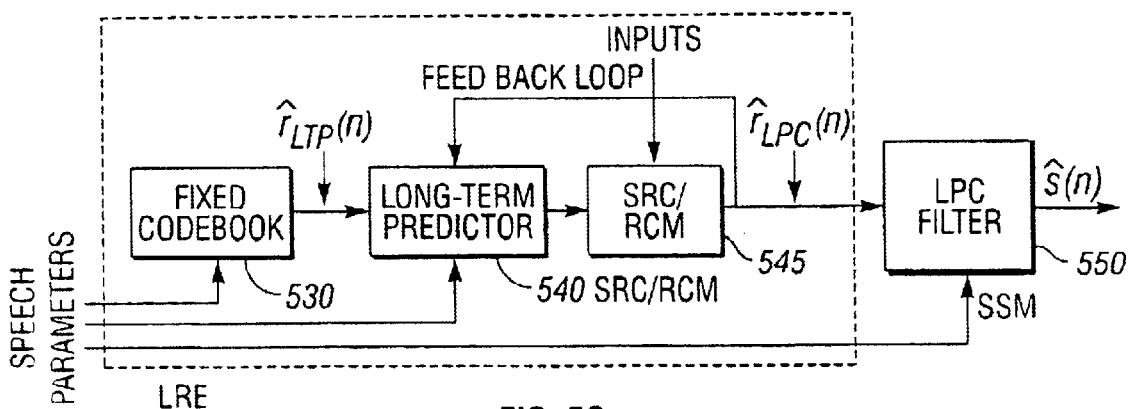
FIGS. 5G–5J show four ways of placing the sample rate conversion within the feed back loop of the speech decoder.
Figure 5H:
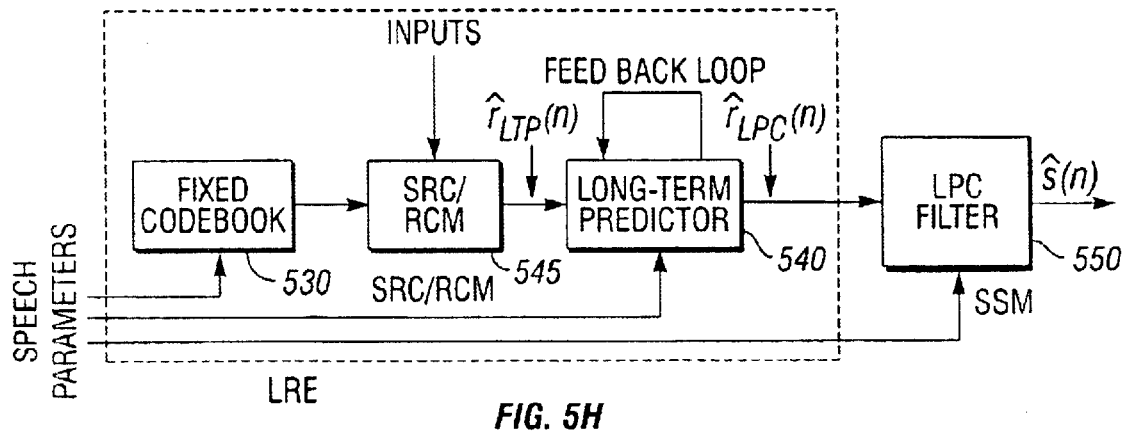
Figure 5I:
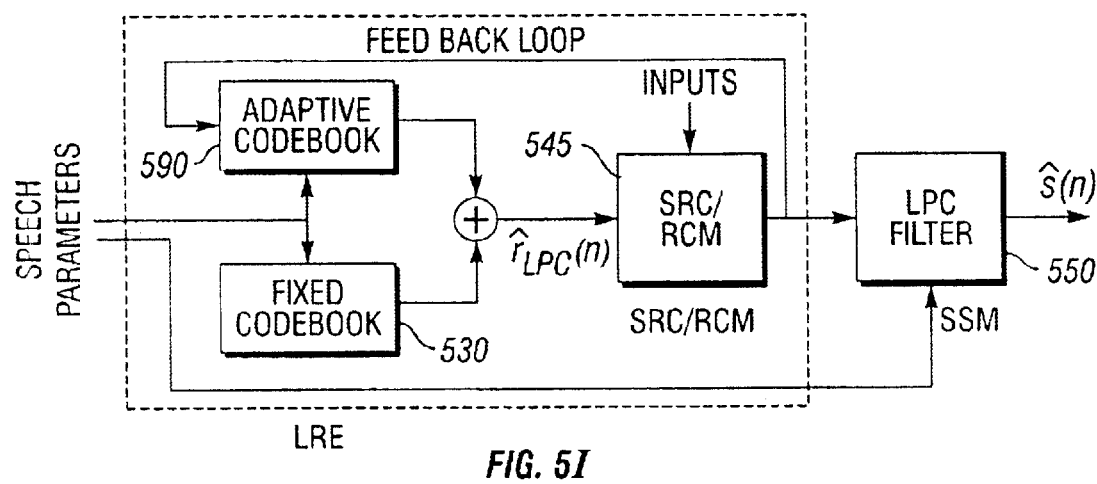

For the speech decoder with LTP filter (see FIG. 5A) the SRC/RCM-modules 545 can be placed within the feedback loop in two different ways, either within the LTP feedback loop as shown in FIG. 5G or in the output from the fixed codebook 530 as shown in FIG. 5H. For the speech decoder with adaptive codebook (see FIG. 5B) the SRC/RCM can also be placed in two different ways, i.e. either before (FIG. 5J) or after, FIG. 5I, the summation of the outputs from the adaptive and the fixed codebook.

Figure 7:
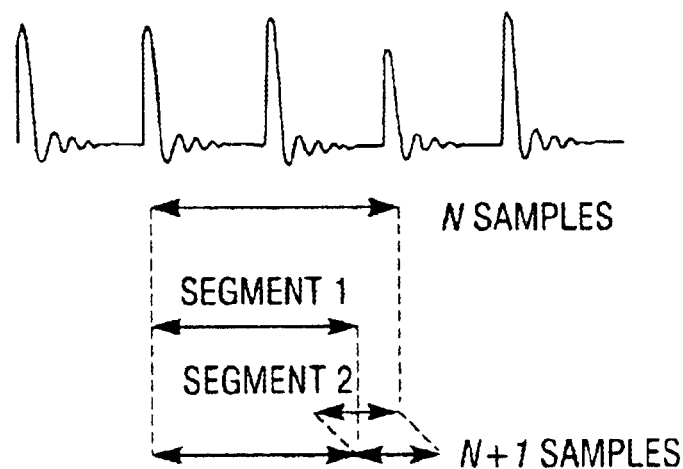
FIG. 7 illustrates LPC-history extension.
Figure 8:
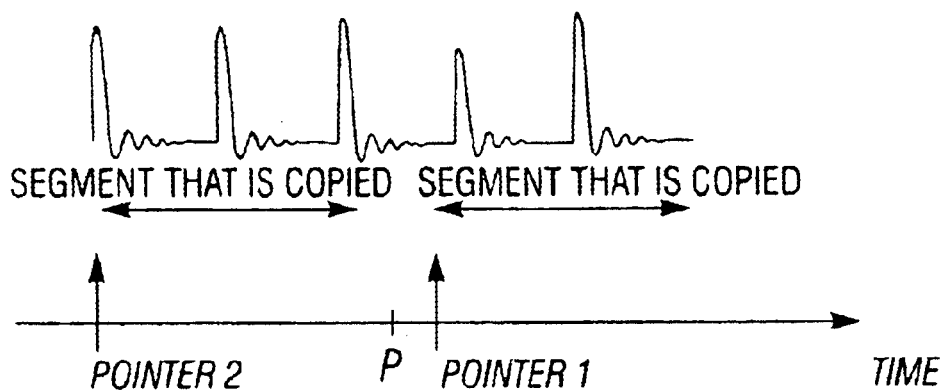
FIG. 8 illustrates copying of the history of the LPC residuals.

The alterations on the LPC residual consists of removing or adding samples just before, but since the SRC/RCM-modules 545 are placed within the LTP feedback loop, some modifications must be done. The extending or shortening of a segment can be done in three ways either at the respective ends of the segment or somewhere in the middle of the segment. FIG. 7 shows the case where the LPC residual is extended by copying two overlapping segments, segment 1 and segment 2, from the history of the LPC residual to create the longer LPC residual. The normal case when no insertion or deletion is needed would be to copy N samples. Shortening the LPC residual is achieved by copying two segments that has a gap between them instead of being overlapped. As before, it is important that a pitch pulse is not doubled or removed since this would introduce perceptual artifacts. Hence, an analysis should be performed in order to evaluate where to add or remove segments. The analysis is preferably made by using the same methods as discussed above regarding how to find the position where to add or remove a sample in the RCM-module.

For all implementations except when the SRC/RCM-modules 545 are placed between the fixed codebook 530 and the LTP filter 540 the history of the LPC residual also has to be modified. The lag L will be increased or decreased for the specific part of the history where a sample is inserted or deleted. Thus the starting position of the segment that will be copied from the history of the LPC residual, Pointer 1 or Pointer 2 in FIG. 8, needs modification. If the segment to copy is newer, i.e. the case of Pointer 1, there is need to modify the starting position. If, however, the segment to copy is older, i.e. the case of Pointer 2, then the pointer should be increased or decreased depending on if a sample is inserted or deleted. This has to be managed for subsequent sub-frames and frames as long as the modification is within the history of the LPC residual.

Figure 5J:
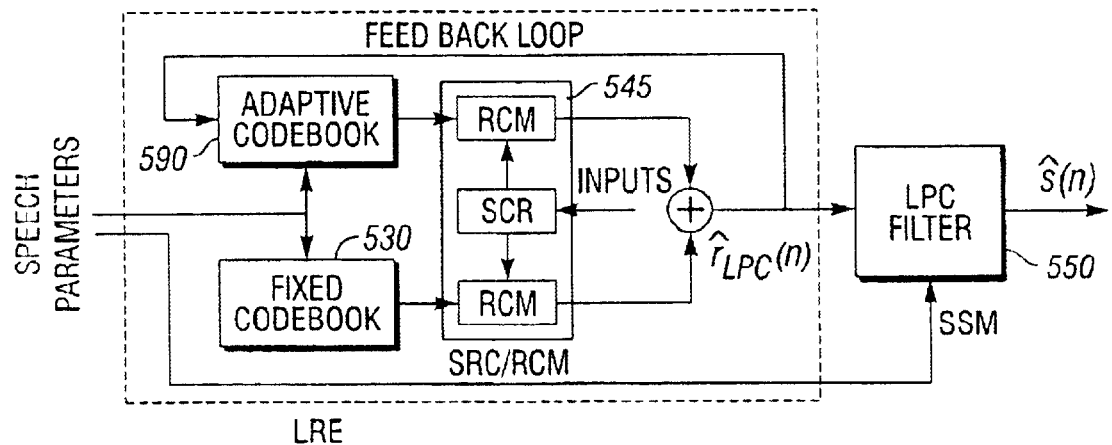

When the SRC/RCM-modules are placed before the summation of the outputs from the adaptive and the fixed codebook as shown in FIG. 5J the length of the fixed codebook also needs to be changed. This is done by adding a sample, preferably a zero sample, in the output from the fixed codebook or removing one of the components. The insertion and deletion in the fixed codebook should be synchronised with the insertion and deletion in the adaptive codebook.

Embodiments of the invention being thus described, it will be obvious that the same may be varied in many ways. Such variations are not to be regarded as a departure from the scope of the invention, and all such modifications as would be obvious to a person skilled in the art are intended to be included within the scope of the following claims.

What is claimed is:

1. A method of improving speech quality in a communication system comprising a first terminal unit (TRX1), which transmits speech signals having a first sampling frequency (F1) and a second terminal (TRX2), which receives the speech signals, the method performed at the second terminal and comprising:
   receiving said speech signals;
   decoding the received speech frame;
   buffering said decoded speech frame in a playout buffer of said second terminal (TRX2);
   performing a dynamic sample rate conversion of said decoded speech frame comprising N samples on a sample by sample basis, said dynamic sample rate conversion comprising:
      creating a first LPC-residual excitation frame comprising N samples derived from said decoded speech frame;
      calculating whether a sample should be either added or removed from said first LPC-residual excitation frame;
      selecting, in response to a determination that said calculating so demands, the position where in said first LPC-residual excitation frame to add or remove a sample;
      generating a second modified LPC-residual excitation frame comprising at least one of N−1 and N+1 samples, in response to a determination that said calculating so demands; and
      synthesizing, in response to a determination that said calculating so demands, a second speech frame from said second modified LPC-residual excitation frame; and
      playing out, in response to a determination that said calculating so demands, said second speech frame from said play out buffer.

2. The method of claim 1 wherein the creating step comprises performing an LPC-analysis of the speech frame in order to find LPC-parameters of said speech frame.

3. The method of claim 1 wherein the creating step comprises using already existing LPC-parameters from a speech decoder.

4. The method of claim 1 wherein the creating step comprises using an existing LPC-residual from a decoder.

5. The method of claim 1, wherein the calculating step comprises deciding whether a sample should be added or removed based on at least one of the following inputs:
   sample frequencies of the sending (TRX1) and receiving (TRX2) terminal units;
   a voice activity detector signal;
   a status of the playout buffer, and
   an indicator of a beginner of a talkspurt.

6. The method of claim 5 wherein said second second terminal unit uses a second sampling frequency (F2) which is a different frequency than said first sampling frequency.

7. The method of claim 1, wherein said position is found by searching for a segment of said first LPC-residual excitation frame with low energy.

8. The method of claim 7 wherein said segment of low energy is found via a block energy analysis.

9. The method of claim 7 wherein said segment of low energy is found via a sliding window energy analysis.

10. The method of claim 1 wherein said second second terminal unit uses a second sampling frequency (F2) which is a different frequency than said first sampling frequency.

11. The method of claim 1 wherein said position is found using knowledge about a position of a pitch pulse and knowledge about a time difference between said pitch pulse and a follow pitch pulse to select the position at which to add or remove a sample in the LPC-residual.

12. The method of claim 11 further comprising the step of finding said pitch pulse via a search for positions in the LPC residual with high energy.

13. The method of claim 12 wherein said positions with high energy are found via a block energy analysis.

14. The method of claim 12 wherein said positions with high energy are found via a sliding window energy analysis.

15. The method of claim 1 wherein said adding comprises adding a zero sample.

16. The method of claim 1 wherein said adding comprises adding a zero sample and interpolating surrounding samples.

17. The method of claim 1 wherein said removing comprises removing a sample from the LPC-residual.

18. The method of claim 1 wherein said adding comprises:
   adding a sample in history of the LPC residual; and
   increasing a lag pointer so long as the adding is within an LPC residual history.

19. The method of claim 1 wherein said removing comprises:
  removing a sample in a history of the LPC residual; and
  decreasing a lag pointer so long as the removing is within the LPC residual history.

20. The method of claim 1 wherein the second terminal unit comprises an adaptive and a fixed codebook; and
  wherein said adding comprises:
    adding a sample in an output from the adaptive codebook;
    extending an output from the fixed codebook; and
    increasing a lag pointer so long as the adding is within the LPC residual history.

21. The method of claim 1 wherein the second terminal unit comprises an adaptive and a fixed codebook; and
  wherein said removing comprises:
    removing a sample in an output from the adaptive codebook;
    shortening an output from the fixed codebook; and
    decreasing a lag pointer so long as the removing is within the LPC residual history.

22. The method of claim 1 wherein the second terminal unit comprises a fixed codebook; and
  wherein said adding or removing comprises adding or removing a sample in an output from the fixed codebook.

23. An apparatus for improving speech quality in a communication system comprising a first terminal unit (TRX1) which transmits speech signals having a first sampling frequency ($F_1$) and a second terminal unit (TRX2), which receives said speech signals, said apparatus comprising:
  means for receiving said speech signals;
  means for decoding the received speech frame;
  means for buffering said decoded speech frame in a playout buffer of said second terminal (TRX2);
  means for performing a dynamic sample rate conversion of said decoded speech frame comprising N samples on an sample by sample basis, wherein said means for performing said dynamic sample rate conversion comprises:
    means for creating a first LPC-residual excitation frame comprising N samples derived from said speech time;
    means for calculating whether a sample should be added or removed from first said LPC-residual excitation frame;
    means for selecting, in response to a determination that said calculating so demands, the position where in said first LPC-residual excitation frame to add or remove a sample;
    means for generating a second modified LPC-residual excitation frame comprising at least one of N−1 and N+1 samples in response to a determination that said calculating so demands; and
    means for synthesizing a second speech frame from said second modified LPC-residual excitation frame in response to a determination that said calculating so demands; and
  means for playing out said second speech frame from said play out buffer in response to a determination that said calculating so demands.

24. The apparatus of claim 23 wherein the means for creating comprises means for performing an LPC-analysis of the speech frame to find LPC-parameters of said speech frame.

25. The apparatus of claim 23 wherein the means for creating comprises means for using existing LPC-parameters from a speech decoder.

26. The apparatus of claim 23 wherein said position is found by searching for a segment of said first LPC-residual excitation frame with low energy.

27. The apparatus of claim 23, wherein the means for calculating comprises means for deciding if a sample should be added or removed on the basis of a function of at least one of the following inputs;
  sample frequencies of sending and receiving terminal units;
  a voice activity detector signal;
  a status of the playout buffer; and
  an indicator of a beginning of a talkspurt.

28. The apparatus of claim 27 wherein said second second terminal unit uses a second sampling frequency (F2) which is a different frequency than said first sampling frequency.

29. The apparatus of claim 27 wherein the means for searching comprises means for performing a block energy analysis.

30. The apparatus of claim 27 wherein the means for searching comprises means for performing a sliding window energy analysis.

31. The apparatus of claim 23 wherein said second second terminal unit uses a second sampling frequency (F2) which is a different frequency then said first sampling frequency.

32. The apparatus of claim 23 wherein the means for selecting comprises means for using knowledge about a position of a pitch pulse together with knowledge about a time difference between said pitch pulse and a following pitch pulse to select the position at which to add or remove a sample in the LPC-residual.

33. The apparatus of claim 32 wherein the means for using knowledge about pitch pulses comprises means for finding the pitch pulses by searching for positions in the LPC residual with high energy.

34. The apparatus of claim 33 wherein the means for finding pitch pulses comprises means for performing a block energy analysis.

35. The apparatus of claim 33 wherein the means for finding pitch pulses comprises means for performing a sliding window energy analysis.

36. The apparatus of claim 23 wherein the means for performing adding or removing comprises means for adding a zero sample.

37. The apparatus of claim 23 wherein the means for performing adding or removing comprises means for removing a sample from the LPC-residual.

38. The apparatus of claim 23 wherein the means for performing adding or removing comprises means for adding a zero sample and interpolating surrounding samples.

39. The apparatus of claim 23 wherein the means for performing adding or removing comprises:
  means for adding a sample in a history of the LPC residual; and
  means for increasing a lag pointer so long as the adding is within the LPC residual history.

40. The apparatus of claim 23 wherein the means for performing adding or removing comprises:
  means for removing a sample in a history of the LPC residual; and
  means for decreasing a lag pointer so long as the removing is within the LPC residual history.

41. The apparatus of claim 23 wherein the second terminal unit comprises:

an adaptive and a fixed codebook;

means for adding a sample in an output from the adaptive codebook;

means for extending an output from the fixed codebook; and means for increasing a lag pointer so long as the adding is within the LPC residual history.

42. The apparatus of claim 23 wherein the second terminal unit comprises:

an adaptive and a fixed codebook;

means for removing a sample in an output from the adaptive codebook;

means for removing a sample in an output from the fixed codebook; and means for decreasing a lag pointer so long as the removing is within the LPC residual history.

43. The apparatus of claim 23 wherein the second terminal unit comprises:

a fixed codebook; and means for adding or removing a sample in an output from the fixed codebook.

* * * * *

UNITED STATES PATENT AND TRADEMARK OFFICE
CERTIFICATE OF CORRECTION

PATENT NO. : 6,873,954 B1
APPLICATION NO. : 09/655326
DATED : March 29, 2005
INVENTOR(S) : Sundqvist et al.

It is certified that error appears in the above-identified patent and that said Letters Patent is hereby corrected as shown below:

In Column 3, Line 33, after "using" delete "the" and insert -- an --, therefor.

In Column 3, Line 54, delete "detected." and insert --denoted: --, therefor.

In Column 3, Line 58, delete "and" and insert -- an --, therefor.

In Column 5, Line 20, after "connected" insert -- directly --.

In Column 5, Line 20, after "to" delete "the" and insert -- that --, therefor.

In Column 5, Line 41, delete "and" and insert -- an --, therefor.

In Column 6, Line 31, delete "5C-5F.)" and insert -- 5C-5F). --, therefor.

In Column 6, Line 48, delete "5G-5J.)" and insert -- 5G-5J). --, therefor.

In Column 7, Line 13, delete "The" and insert -- This --. therefor.

In Column 8, Line 30, in Claim 5, after "buffer", delete "," and insert -- : --, therefor.

In Column 8, Line 31, in Claim 5, delete "beginner" and insert -- beginning --, therefor.

In Column 8, Line 32, in Claim 6, after "second" delete "second".

In Column 8, Line 42, in Claim 10, after "second" delete "second".

In Column 8, Line 48, in Claim 11, delete "follow" and insert -- following --, therefor.

In Column 8, Line 65, in Claim 18, after "in" insert -- a --.

In Column 9, Line 40, in Claim 23, delete "an" and insert -- a --, therefor.

In Column 9, Line 45, in Claim 23, delete "time" and insert -- frame --, therefor.

In Column 10, Line 10, in Claim 27, after "inputs" delete ";" and insert -- : --, therefor.

In Column 10, Line 17, in Claim 28, after "second" delete "second".

UNITED STATES PATENT AND TRADEMARK OFFICE
CERTIFICATE OF CORRECTION

PATENT NO. : 6,873,954 B1
APPLICATION NO. : 09/655326
DATED : March 29, 2005
INVENTOR(S) : Sundqvist et al.

It is certified that error appears in the above-identified patent and that said Letters Patent is hereby corrected as shown below:

In Column 10, Line 25, in Claim 31, after "second" delete "second".

Signed and Sealed this

Thirtieth Day of October, 2007

JON W. DUDAS
*Director of the United States Patent and Trademark Office*